Patented Nov. 11, 1924.

1,515,364

UNITED STATES PATENT OFFICE.

RURIC CREEGAN ROARK, OF BALTIMORE, MARYLAND.

DEODORANT AND INSECTICIDE.

No Drawing.  Application filed April 19, 1922. Serial No. 555,630.

*To all whom it may concern:*

Be it known that I, RURIC C. ROARK, a citizen of the United States, residing in the city of Baltimore and State of Maryland, have invented certain new and useful Improvements in Deodorants and Insecticides, of which the following is a specification.

This invention relates to a composition of matter intended for diffusing a pleasing odor throughout the space surrounding it, for repelling moths from clothing, for killing and mitigating the peach tree borer in peach trees, and for other insecticidal purposes.

This invention also relates to a process of preparing the composition of matter for the above uses.

For deodorizing a room in which an unpleasant odor may be present, for example, a bathroom, toilet room, etc., or a place where an unpleasant odor may be caused by the crowding of people, such as street and railway cars, waiting room, theatres, halls, schools, public buildings, etc., the method in vogue may be classified under two divisions. According to the first method, an odoriferous substance such as a volatile oil or perfume, is disseminated throughout the atmosphere by spraying. The oil or perfume for this purpose is usually dissolved in alcohol or other appropriate solvent, or may be emulsified in water and is blown into the air in the form of a fine mist by means of a pump or atomizer.

The second method of deodorizing consists in liberating a gas or in disseminating a material which will act chemically upon the malodorous substances present and convert them to non-odorous substances. Fumigation with formaldehyde is an example of this method.

In a former Patent, No. 1,346,337, granted July 13, 1920, I utilize paradichlorobenzene as the solid volatile material with which odoriferous materials may be combined to give a pleasant odor.

The present invention is an improvement in the art of deodorizing, as above outlined, in that the material employed as a solid volatile carrier of the perfume or other odoriferous materials itself possesses a pleasant odor. In the present invention, I employ paranitrochlorobenzene, a chemical compound which has a melting point of about 83° C., and a boiling point of about 242° C. It occurs as yellowish crystals, soluble in alcohol and ether, and insoluble in water. The formula of this compound is $C_6H_4ClNO_2$, and the chloro (Cl) and nitro ($NO_3$) groups are opposite each other in the benzene nucleus, or in the para position.

For deodorizing and insecticidal purposes, it is not necessary to employ paranitrochlorobenzene of the highest purity, the technical grade being quite suitable.

Paranitrochlorobenzene has a great advantage over naphthalene as a solid volatile deodorizing and insecticidal material in that naphthalene possesses a very strong characteristic odor which is very distasteful and is everywhere recognized as the odor of "moth balls"; whereas, paranitrochlorobenzene possesses the odor of oil of mirbane—an oil which is adapted for scenting and perfuming purposes.

Recognizing the valuable properties of naphthalene as a moth repellent many persons have endeavored in vain to cover up its unpleasant odor. For example, mixtures of lavender flowers and naphthalene flakes, or cedar wood chips and naphthalene flakes are sold as moth repellents, but in both of these mixtures, the odor of naphthalene is predominant. A mixture of naphthalene and gum camphor has been prepared by melting the two ingredients together and allowing to cool in the form of pellets or balls, similar in appearance to "moth balls". When freshly prepared, as little as 1 to 2 per cent camphor will disguise the odor of naphthalene but on account of the higher vapor pressure of camphor, it volatilizes faster than naphthalene and after a period of time, only the naphthalene remains. More recently, smelling salts, which slowly give off ammonia, together with volatile oils have been mixed with naphthalene but the odor of the latter is still so strong as to render the preparation objectionable for deodorizing purposes.

For deodorizing purposes, paranitrochlorobenzene is preferable to paradichlorobenzene, in that its odor is more pleasant. Furthermore, its melting point is higher (83° C. as against 53° C.) and it therefore does not soften and run out of its container in hot weather, as paradichlorobenzene may do, more especially when essential oils or perfumes are added, which addition materially lowers the melting point.

Inasmuch as paranitrochlorobenzene possesses the odor of oil of mirbane, it is not necessary to employ this oil when this odor is desired, whereas paradichlorobenzene does not possess this odor and the incorporation of the oil is necessary when using that material as the base of a solid volatile deodorizing composition of matter. A mixture of paradichlorobenzene and oil of mirbane is one of the popular deodorizing preparations.

As an insecticide, paranitrochlorobenzene may be used wherever naphthalene or paradichlorobenzene is used, and is superior to both these materials in that it is more toxic to insects. For example, paranitrochlorobenzene may be strewn among clothing, woolens, furs, hides, etc., to repel moths in the same manner in which naphthalene and paradichlorobenzene are used. For this purpose, the paranitrochlorobenzene may be used in the form of flakes or crystals, powder, granules, blocks or balls. The paranitrochlorobenzene may also be applied for insecticidal purposes, dissolved in alcohol, benzol, carbon disulfide, or other appropriate solvent; or it may be emulsified in water by the aid of soap, sulphonated oil gums, saponin, casein, caseinogenates, or other well known emulsifying agents; and as a solution or emulsion may be sprayed or scattered over hides or into wheat bins or other places infested with insects.

When used against the peach tree borer, my tests have indicated that paranitrochlorobenzene is more toxic than paradichlorobenzene when used in the same manner. The preferred way to employ paranitrochlorobenzene against the peach tree borer is as follows: First level the surface of the soil around the base of the tree, then sprinkle about ½ to 1 ounce of the material in crystal or flake form around the tree in a continuous band 2 inches wide, with the inner margin from 2 to 4 inches from the bark of the tree. Then cover the material with soil around the base of the tree to a depth of from 2 to 4 inches and pack down firmly. Spring or fall is the best time for this treatment. The soil should not be too wet and should have a temperature of not less than 50° F.

When used for deodorizing purposes, the paranitrochlorobenzene is preferably prepared as follows: A quantity is melted in a suitable container by the application of heat (preferably in a steam jacketed pot or kettle) and to this molten material is added and thoroughly stirred in, a perfume, essential oil, or other odoriferous substance, the odor of which it is desired to disseminate. A dye or coloring material may be added if desired. The molten material is now poured into suitable molds and allowed to cool. In this way, blocks of a solid, completely volatile, odoriferous substance are obtained.

In place of paranitrochlorobenzene, I may with some considerable measure of success, employ any other solid, volatile nitro derivatives and more advantageously, any solid, volatile nitro-chloro derivatives of hydrocarbons comprising in their chemical structure the benzene-nucleus as, for example, benzol, toluol and naphthalene. Dinitrobenzol, dinitrotoluene, dinitronaphthalene, meta-nitro-chlorbenzol and dinitrochlorobenzol may, for example, be advantageously used. These substances are all solid at ordinary temperature, possess sufficient vapor pressure to cause them to evaporate if left exposed, and having a pleasant odor.

While I have described in detail, the preferred practice of my process, it is to be understood that the details of procedure and proportion of ingredients may be widely varied, and that known chemical equivalents may be employed in place of the materials mentioned without departing from the spirit of the invention or the scope of the subjoined claims.

Having thus described my invention, I claim:

1. The process of making a solid volatile composition of matter, suitable for use as a deodorant and insecticide which comprises melting paranitrochlorobenzene, incorporating an odoriferous material therewith, molding the mass into blocks, and allowing the same to cool.

2. The process of making a solid volatile composition of matter, suitable for use as a deodorant and insecticide which comprises melting a nitro derivative of a hydrocarbon of the benzine series, incorporating an odoriferous material therewith, molding the mass into blocks and allowing the same to cool.

3. The process of making a solid volatile composition of matter, suitable for use as a deodorant and insecticide which comprises melting a nitrochloro derivative of a hydrocarbon of the benzine series, incorporating an odoriferous material therewith, molding the mass into blocks, and allowing the same to cool.

In testimony whereof, I affix my signature.

RURIC CREEGAN ROARK.